Patented Aug. 8, 1933

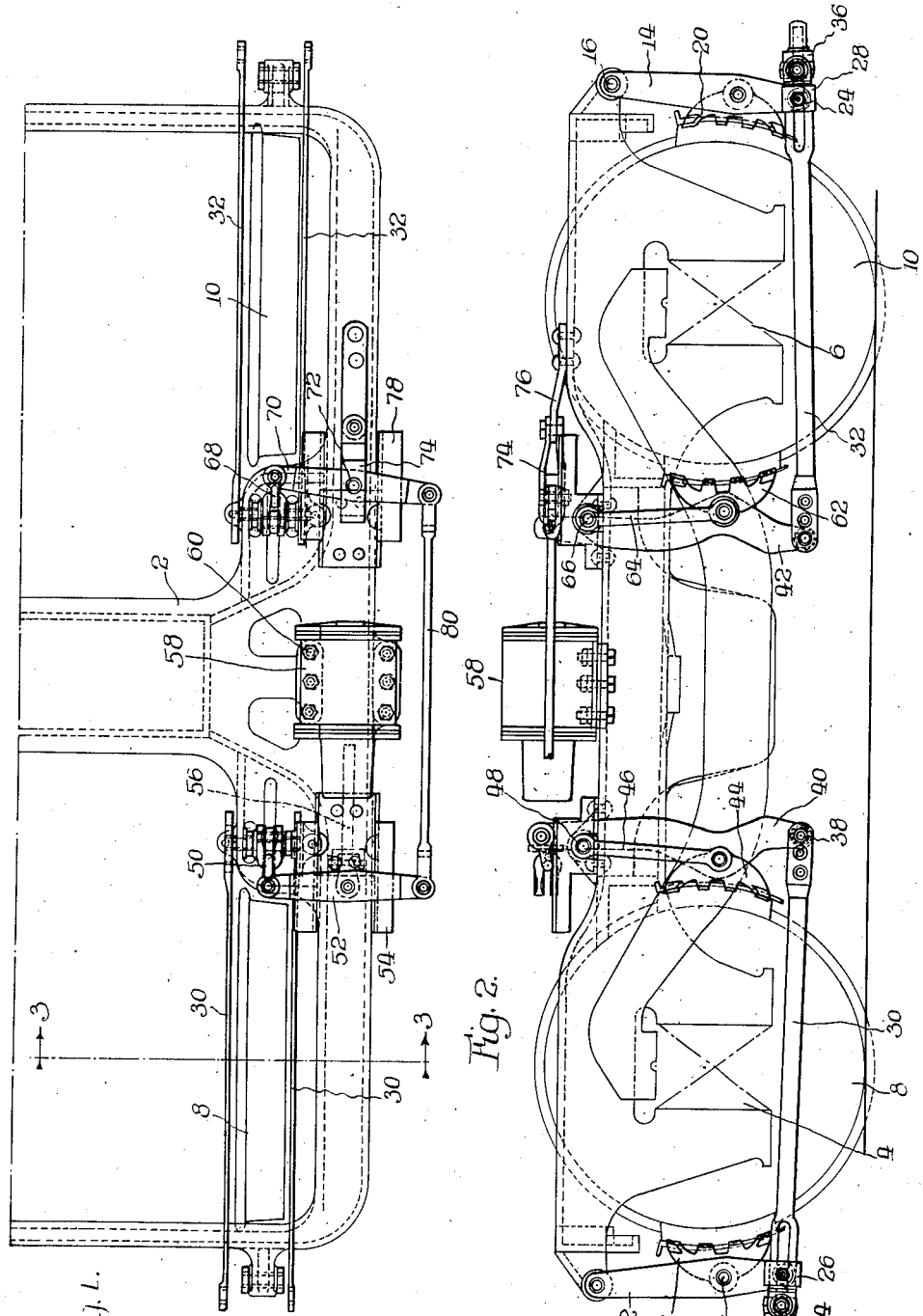

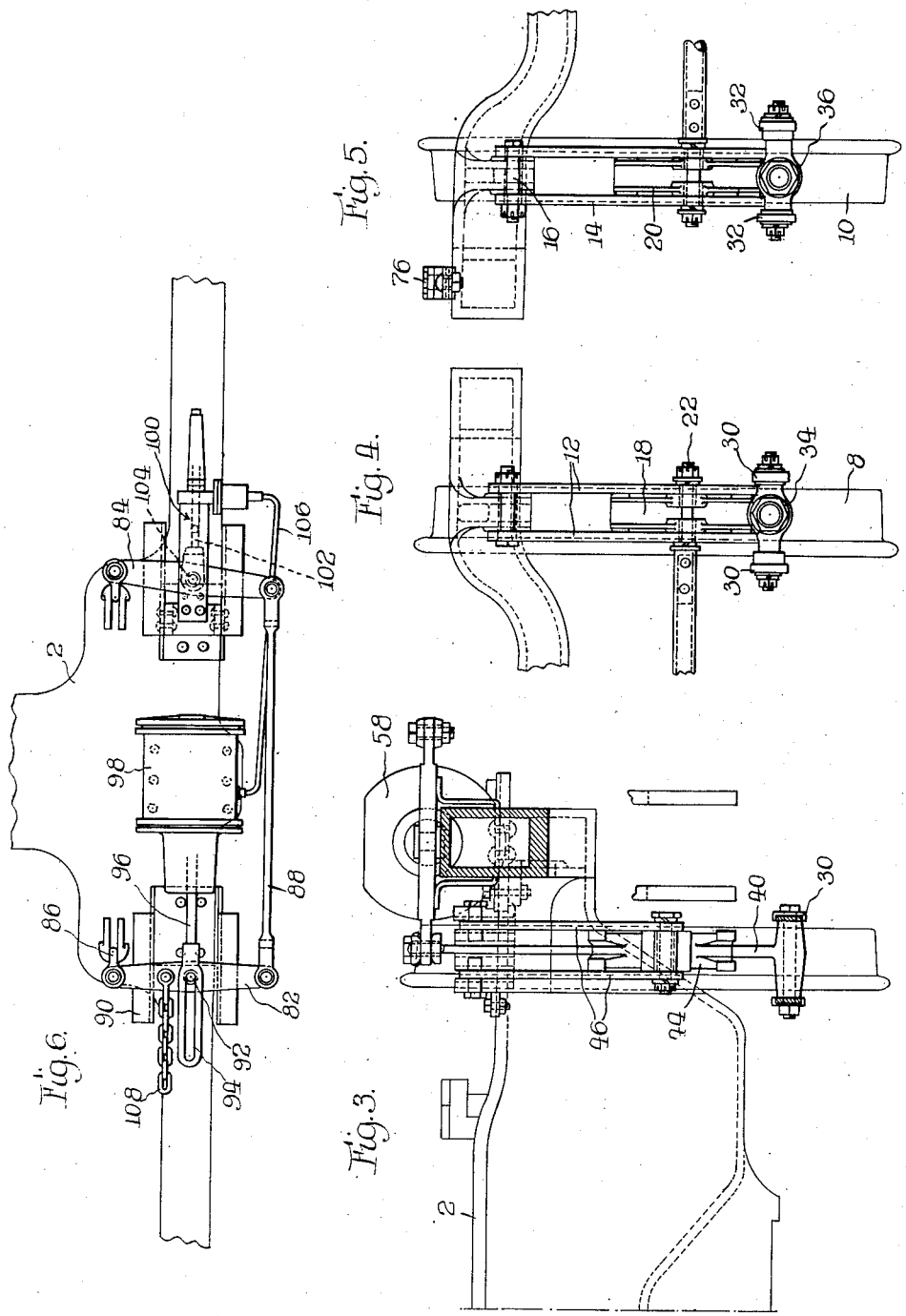

1,921,599

UNITED STATES PATENT OFFICE 1,921,599

BRAKE MECHANISM

Ray G. Aurien, Chicago, Ill., assignor to American Steel Foundries, Chicago, Ill., a Corporation of New Jersey Application October 19, 1931. Serial No. 569,567

12 Claims. (Cl. 188—56)

The present invention relates to brake mechanism or rigging intended for use on railway car trucks, locomotive trucks, and the like, and more particularly to improved brake mechanism for use in connection with brakes of the clasp type.

Among the objects of the present invention is to provide a brake mechanism or rigging which is simple and compact, in which the various connections are short and direct and are readily accessible for adjustment, replacement or for repair.

Another object of the present invention is to provide an improved brake mechanism in which the brake cylinders are preferably mounted upon the truck frame and connected to the clasp brakes in a manner to meet all of the service requirements for successful operation.

The present invention comprehends the idea of providing a brake rigging or mechanism for use in railway car trucks and includes truck levers suitably connected and associated with equalizer levers adapted to transmit braking movements from a brake cylinder to these truck levers. Further, if desired, suitable manually operated means may be connected to one or more of these equalizer levers for effecting a braking movement of the brake levers, should the brake cylinders be put out of order for any reason. Such manually operated means could or may be used in conjunction with a pneumatic means, if desired.

Still another object within the purview of the present invention is to provide a brake rigging including truck levers and equalizer levers associated therewith, in which slack adjusting means is provided and associated with these equalizer levers for their proper adjustment. More particularly, the invention contemplates the idea of providing a brake mechanism in which the slack adjuster provides a mounting for movably supporting an equalizer lever of the brake mechanism.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts—

Figure 1 is a fragmentary top plan view of a railway car truck including a brake rigging or mechanism made in accordance with the present invention;

Figure 2 is a view in side elevation of the car truck and brake rigging disclosed in Figure 1 of the drawings;

Figure 3 is a fragmentary view in vertical cross section taken in a plane represented by line 3—3 of Figure 1 of the drawings;

Figure 4 is a fragmentary view in end elevation of the left hand portion of the truck shown in Figure 1 of the drawings;

Figure 5 is a fragmentary view in end elevation of the right hand portion of the truck shown in Figure 1 of the drawings; and Figure 6 is a fragmentary top plan view of a railway car truck including another brake rigging or mechanism made in accordance with the present invention.

Referring now more in detail to the drawings, a brake rigging or mechanism made in accordance with the present invention is disclosed in connection with a railway car truck frame 2 supported on journal boxes, diagrammatically shown as 4 and 6 and which are supported on the outer ends of wheel and axle assemblies having the wheels 8 and 10. Inasmuch as the brake rigging or mechanism of the present disclosure is of a similar construction on both sides of the frame 2, the following description will apply to the mechanism on either side of the truck 2.

The brake mechanism of the present disclosure comprises the outer dead hanger or truck levers 12 and 14 pivotally supported, as at 16, to each end of the truck frame 2 and adjacent the wheels 8 and 10 of the wheel and axle assemblies, these dead hanger levers pivotally supporting the outer brake heads 18 and 20 intermediate their ends, as at 22, which carry brake shoes adapted to engage with the periphery of the wheels 8 and 10, respectively. The lower end of each of the dead truck levers 12 and 14 is pivotally connected, as at 24, to slidable blocks 26 and 28 movable within the slotted end of connecting straps or pull rods 30 and 32, a pair of these straps being provided for each of the wheels 8 and 10 and straddling the same. The blocks 26 and 28 are adjustable within the slots of the straps 30 and 32, respectively, by the slack adjusters 34 and 36 for taking up slack in the brake rigging or mechanism. The inner ends of the straps 30 and 32 are adjustably connected, as at 38, to the lower end of the live truck levers 40 and 42, respectively.

The live truck lever 40 is connected intermediate its ends to a brake head 44 carrying a brake shoe for engagement with the periphery of the wheel 8, the brake head being movably supported at the lower end of a brake hanger 46 having its upper end pivoted to the truck frame 2, as at 48. The upper end of the live truck lever 40 is interconnected by means of the clevises 50 to the inner end of a transversely disposed floating live equalizer lever 52 movably mounted and supported upon the truck frame 2 by means of the brackets 54, this equalizer lever being flexibly connected to the end of a piston 56 of a brake cylinder 58 suitably mounted, as by means of the bolts 60, upon the frame 2.

The live truck lever 42 extends upwardly in a manner similar to the live truck lever 40 and is connected intermediate its ends to a brake head 62 carrying a brake shoe adapted to have frictional engagement with the inner part of the wheel 10, this brake head 62 being pivotally mounted in the lower end of a brake hanger 64 which is pivotally mounted, as at 66, to the truck frame 2. The upper end of the live truck lever 42 is interconnected by means of the clevises 68 to a transversely disposed dead equalizer lever 70, this equalizer lever 70 being pivoted intermediate its ends, as at 72, to the U-shaped strap 74 secured to the bracket 76 mounted upon the truck frame 2. The end portions of this dead equalizer lever are supported for movement upon the brackets 78 suitably connected to the truck frame 2.

The outer ends of the transversely disposed equalizer levers 52 and 70 are interconnected by means of the pull rod 80, whereby braking movements of the piston 56 effect a simultaneous movement of these levers in tandem for movement of the truck levers 40 and 42 and the truck levers 12 and 14 through the medium of the straps 30 and 32, and for movement of the brake shoes associated therewith into engagement with the periphery of the wheels of the wheel and axle assemblies. In this embodiment, it will be clearly apparent that a very compact and simple arrangement has been provided wherein the brake cylinder is connected to the truck frame and intermediate the equalizer levers so that the connections are short and direct. In this particular arrangement, slack in the rigging or mechanism is taken up by the proper adjustment of the slack adjusters 34 and 36.

In Figure 6 of the drawings is disclosed another modification of the present invention and particularly adapted for use in brake rigging of the type disclosed in Figures 1 and 2 of the drawings, the same being associated with the truck frame and wheel and axle assemblies in the manner as hereinbefore set out.

In this embodiment, the equalizer levers 82 and 84 are transversely disposed relative to the truck frame 2 and have their inner ends interconnected by means of the clevises 86 to the upper end of live truck levers, such as 40 and 42 of the previously described embodiment. As in the arrangement shown in Figures 1 and 2 of the drawings, the outer ends of the levers 82 and 84 are interconnected by a pull rod 88 whereby simultaneous movement of these levers in tandem may be effected. Brackets, such as the brackets 90, are provided immediately below these equalizer levers for supporting the same during movement.

The equalizer lever 82 is provided with a pin projection 92 adapted to move within a slot 94 provided in the end of a piston 96 operatively associated with the brake cylinder 98. Upon movement of the piston 96 by any suitable fluidal means under pressure within the brake cylinder 98, the projection engages the end of the slot 94, whereby the equalizer lever 82 is operated for movement of the truck levers and other brake elements associated therewith.

In the embodiment shown in Figures 1 and 2 of the drawings, the brake rigging or mechanism is adjusted for slack by means of the slack adjusters 34 and 36. Such slack adjusters provided at this location are provided for the purpose of readjusting the position of the truck levers and equalizing levers to compensate for brake shoe or wheel wear, and to prevent these levers and their associated connections from working into angular conditions. However, additional slack adjusting means is desirable to readjust the travel of the piston in the brake cylinder so as to maintain uniform braking conditions in connection with the shoe and pneumatic brake equipment to compensate for wear on the brake shoes and wheels.

In order to provide means to adjust the slack in the brake mechanism and to re-adjust the travel of the piston 96 in the brake cylinder 98, a slack adjuster 100 is suitably mounted upon the truck frame 2 and adjacent the position of the equalizer lever 84. This slack adjuster 100 may be of any desired construction and preferably comprises a piston 102 adapted to pivotally support the equalizer lever 84, as at 104. The piston 102 is pneumatically operated through a by-pass 106 communicating with the brake cylinder 98. It is of course understood that the slack adjuster 100 may be operated in any desired manner, as by hand.

In order to insure the operation of the present brake rigging or mechanism under all conditions, and even though the pneumatic means provided is out of adjustment or out of order, the chain 108 is connected to the equalizer lever 82 and operatively associated with a hand brake. This provides an arrangement whereby the brake mechanism can be operated by either the brake cylinder 98 or by the hand brake, as indicated.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a clasp brake mechanism comprising brake levers connected to brake shoes applied to opposite sides of each car wheel, tie straps connecting the lower ends of said brake levers, equalizing levers operatively connected to one of said brake levers for each wheel, a pull rod pivotally connecting the outside ends of said equalizing levers and a brake cylinder the piston of which is pivotally connected to one of said equalizing levers at a point intermediate its ends for transmitting braking movements.

2. In a clasp brake mechanism comprising brake levers connected to brake shoes applied to opposite sides of each car wheel, tie straps connecting the lower ends of said brake levers, equalizing levers operatively connected to one of said brake levers for each wheel, a pull rod pivotally connecting the outside ends of said equalizing levers, a brake cylinder the piston of which is pivotally connected to one of said equalizing levers at a point intermediate its ends, and slack adjuster means for varying the position of one of the said equalizing levers.

3. In a railway car truck, the combination of a truck frame, brake levers connected to brake shoes applied to opposite sides of each car wheel, tie straps connecting the lower ends of said brake levers, a live equalizing lever operatively connected to one of said brake levers, a brake cylinder the piston of which is pivotally connected to said live equalizing lever at a point intermediate its ends, a dead equalizing lever pivotally connected at a point intermediate its ends to said truck frame and a pull rod pivotally connected to the outer ends of said live and dead equalizing levers.

4. In a railway car truck, the combination of a truck frame, brake levers connected to brake shoes applied to opposite sides of each car wheel, tie straps connecting the lower ends of said brake levers, a live equalizing lever operatively connected to one of said brake levers, a brake cylinder the piston of which is pivotally connected to said live equalizing lever at a point intermediate its ends, a dead equalizing lever pivotally connected at a point intermediate its ends to slack adjuster means for varying the position of said dead equalizing lever and a pull rod pivotally connected to the outer ends of said live and dead equalizing levers.

5. In a railway car truck, the combination of a truck frame, a brake cylinder secured to each side of said truck frame at or near the lateral center line of said truck frame, an equalizing lever pivotally connected at a point intermediate its ends to the piston of said brake cylinder for transmitting braking movements.

6. In a railway car truck, the combination of a truck frame, a brake cylinder secured to each side of said truck frame at or near the lateral center line of said truck frame, a live equalizing lever pivotally connected at a point intermediate its ends to the piston of said brake cylinder, a pull rod pivotally connecting the outer end of said live equalizing lever to the outer end of a dead equalizing lever, and slack adjuster means pivotally connected to said dead equalizing lever at a midpoint.

7. In a car truck, the combination of spaced wheels, dead truck levers provided with brake shoes pivotally mounted adjacent the ends of said truck, live truck levers intermediate said wheels and provided with brake shoes cooperating with said wheels, pull rods connecting the lower ends of live and dead levers, live and dead equalizer levers disposed intermediate said wheels and connected adjacent the outer ends thereof by a pull rod, said equalizer levers being connected adjacent the opposite ends thereof to adjacent live levers, and a brake cylinder disposed between said equalizer levers for operating said live equalizer lever, the piston thereof being connected to said live equalizer lever intermediate the ends thereof.

8. In a car truck, the combination of spaced wheels, dead truck levers provided with brake shoes pivotally mounted adjacent the ends of said truck, live truck levers intermediate said wheels and provided with brake shoes cooperating with said wheels, pull rods connecting the lower ends of live and dead levers, live and dead equalizer levers disposed intermediate said wheels and connected adjacent the outer ends thereof by a pull rod, said equalizer levers being connected adjacent the opposite ends thereof to adjacent live levers, and a brake cylinder disposed between said equalizer levers for operating said live equalizer lever, the piston thereof being connected to said live equalizer lever intermediate the ends thereof, the dead equalizer lever being pivotally mounted intermediate the ends thereof to a slack adjuster.

9. In a car truck, the combination of spaced wheels, dead truck levers provided with brake shoes pivotally mounted adjacent the ends of said truck, live truck levers intermediate said wheels and provided with brake shoes cooperating with said wheels, pull rods connecting the lower ends of live and dead levers, live and dead equalizer levers disposed intermediate said wheels and connected adjacent the outer ends thereof by a pull rod, said equalizer levers being connected adjacent the opposite ends thereof to adjacent live levers, and a brake cylinder disposed between said equalizer levers for operating said live equalizer lever, the piston thereof being connected to said live equalizer lever intermediate the ends thereof, the dead equalizer lever being pivotally mounted intermediate the ends thereof to a slack adjuster controlled by said brake cylinder.

10. In a car truck, the combination of spaced wheels, dead truck levers provided with brake shoes pivotally mounted adjacent the ends of said truck, live truck levers intermediate said wheels and provided with brake shoes cooperating with said wheels, pull rods connecting the lower ends of live and dead levers, live and dead equalizer levers disposed intermediate said wheels and connected adjacent the outer ends thereof by a pull rod, said equalizer levers being connected adjacent the opposite ends thereof to adjacent live levers, and a brake cylinder disposed between said equalizer levers for operating said live equalizer lever, the piston thereof being connected to said live equalizer lever intermediate the ends thereof, and hand operating means connected to said live equalizer lever intermediate the ends thereof.

11. In a car truck, the combination of spaced wheels, dead truck levers provided with brake shoes pivotally mounted adjacent the ends of said truck, live truck levers intermediate said wheels and provided with brake shoes cooperating with said wheels, pull rods connecting the lower ends of live and dead levers, live and dead equalizer levers disposed intermediate said wheels and connected adjacent the outer ends thereof by a pull rod, said equalizer levers being connected adjacent the opposite ends thereof to adjacent live levers, a brake cylinder disposed between said equalizer levers for operating said live equalizer lever, the piston thereof being connected to said live equalizer lever intermediate the ends thereof, the dead equalizer lever being pivotally mounted intermediate the ends thereof to a slack adjuster, and hand operating means connected to said live equalizer lever intermediate the ends thereof.

12. In a car truck, the combination of spaced wheels, dead truck levers provided with brake shoes pivotally mounted adjacent the ends of said truck, live truck levers intermediate said wheels and provided with brake shoes cooperating with said wheels, pull rods connecting the lower ends of live and dead levers, live and dead equalizer levers disposed intermediate said wheels and connected adjacent the outer ends thereof by a pull rod, said equalizer levers being connected adjacent the opposite ends thereof to adjacent live levers, a brake cylinder disposed between said equalizer levers for operating said live equalizer lever, the piston thereof being connected to said live equalizer lever intermediate the ends thereof, the dead equalizer lever being pivotally mounted intermediate the ends thereof to a slack adjuster controlled by said brake cylinder, and hand operating means connected to said live equalizer lever intermediate the ends thereof.

RAY G. AURIEN.